United States Patent

[11] 3,532,058

| [72] | Inventor | Benjamin van der Meide, 5296 South 2nd Street West, Utah 84107 |
|---|---|---|
| [21] | Appl. No. | 721,819 |
| [22] | Filed | April 16, 1968 |
| [45] | Patented | Oct. 6, 1970 |

[54] MATERIAL HANDLING APPARATUS
5 Claims, 8 Drawing Figs.

[52] U.S. Cl. ................................................ 104/1,
188/5, 214/370, 238/10, 280/47.27
[51] Int. Cl. ...................................................... B61b
[50] Field of Search ............................................ 104/1, 134;
188/5(A); 280/47.27, 47.28, 47.29; 214/370;
238/10, 14

[56] References Cited
UNITED STATES PATENTS

| 676,163 | 6/1901 | Victor | 280/47.27 |
| 978,428 | 12/1910 | Barba | 280/47.27 |
| 981,613 | 1/1911 | Carter | 238/10 |
| 1,379,958 | 5/1921 | Blumenthal | 238/10 |
| 2,200,935 | 5/1940 | Rodriguez | 188/5 |
| 2,423,065 | 6/1947 | Garbarino | 280/47.27 |

*Primary Examiner*—Arthur L. La Point
*Assistant Examiner*—Richard A. Bertsch
*Attorney*—B. Deon Criddle

ABSTRACT: A hand truck and track system for loading and unloading vehicle trucks and the like. The hand truck is provided with folding rest legs and can be fitted with either skid shoes having retarding surfaces or with roller means having brakes to automatically prevent reverse travel. The tracks are rails that provide selectively an untreated skid path and a path coated with a nonskid surfacing material for the skid shoes or rollers.

Patented Oct. 6, 1970
3,532,058
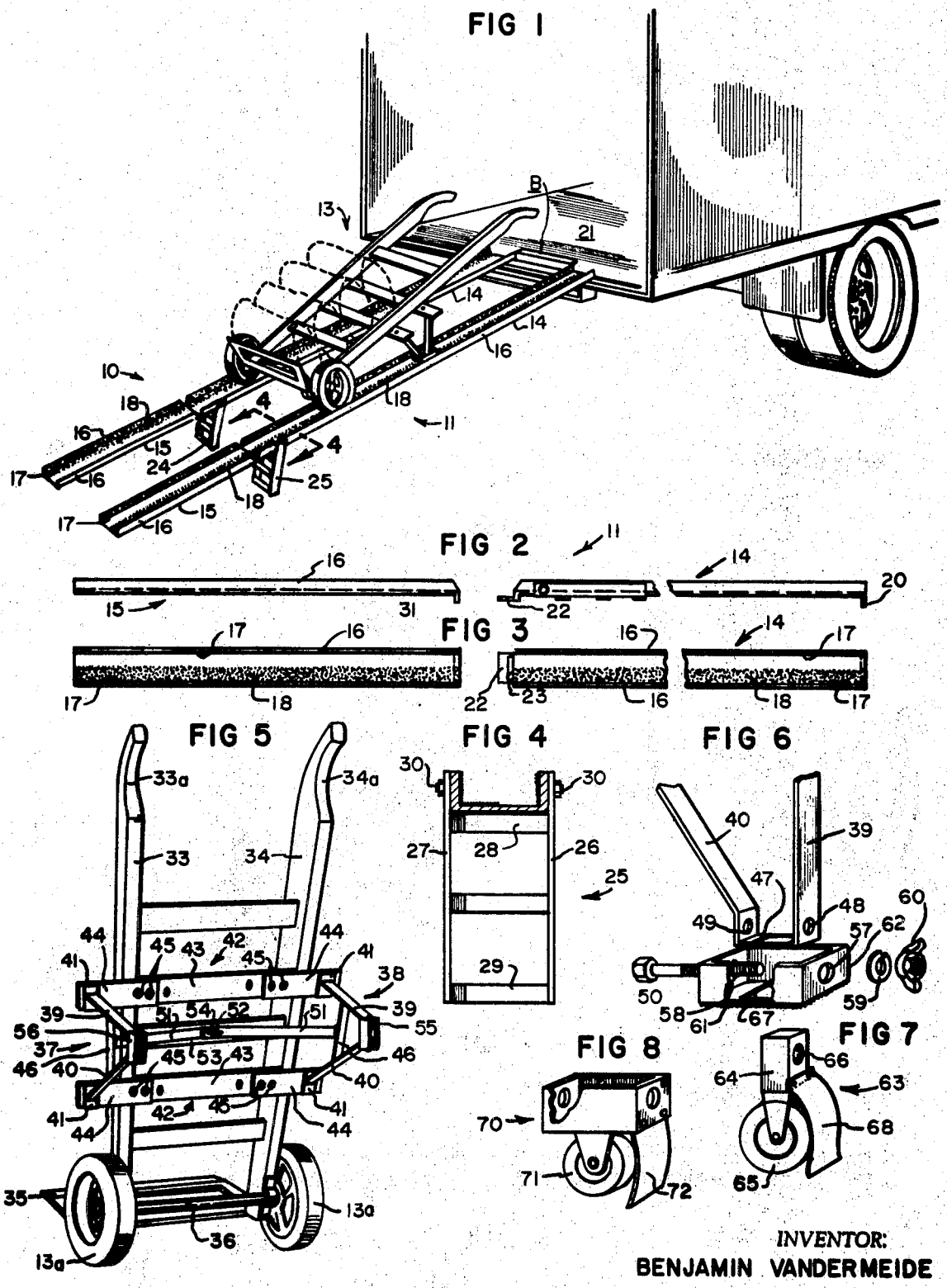
INVENTOR:
BENJAMIN VANDERMEIDE
BY:
B. Dean Eiselle
ATTORNEY

MATERIAL HANDLING APPARATUS

BRIEF DESCRIPTION

There has long been a need for simplifying the work involved in loading and unloading vehicle trucks and the like, and for reducing the dangers in performing such labor. It is for these reasons that many material handling systems have been developed. Some of these have taken the form of elevator-type tail gates or special elevating trucks, and others, concerned particularly with the safe transportation of goods and the safety of a user, have involved hand trucks equipped with brakes. However, so far as I am aware, none have heretofore involved an inexpensive hand truck and track combination that can be easily and safely used by a single operator to move even very heavy loads on to or off of a truck or other such vehicle, or from one location to another.

It is an object of the present invention to provide such a system. That is, one wherein a hand truck is constructed to work particularly in combination with a pair of tracks such that even very heavy loads can be safely moved from one location to another with relative ease.

Principle features of the invention include channel shaped tracks, each preferably having a longitudinal portion of the web thereof coated with an anti-skid surfacing material, and with the inner surfaces of their side flanges each coated with anti-skid surfacing material. A hand truck equipped with rest legs, each having a skid shoe or roller assembly adapted to travel in a track, is used in combination with the tracks to transport the goods being moved.

Additional objects and features of the invention will become apparent from the following detailed description and drawings, disclosing what is presently contemplated as being the best mode of the invention.

THE DRAWINGS

FIG. 1 is a perspective view of the invention, with the tracks attached to the rear of a truck, which is shown fragmentarily;

FIG. 2, a side elevation view of long and short rails usable independently or together in making up a typical track;

FIG. 3, a top plan view of the rails of Fig. 2;

FIG. 4, a vertical section, taken on the line 4—4 of Fig. 1;

FIG. 5, a rear perspective view of the hand truck of the invention;

FIG. 6, a fragmentary, exploded, perspective view of the end of a hand truck leg and skid shoe;

FIG. 7, a perspective view of a wheel assembly adapted to be used with the skid shoe; and FIG. 8, a perspective view, partially broken away for clarity, of an alternative wheel assembly.

DETAILED DESCRIPTION

Referring now to the drawings:

In the illustrated preferred embodiment, the invention includes a pair of tracks 10 and 11 and a hand truck shown generally at 13.

Each track may include a long section of rail 14 and a short section of rail 15, and these long and short sections can be used separately as tracks or they can be coupled together, as shown in Fig. 1, so that the tracks will provide an extended and more gradually inclined ramp surface.

The rails of the tracks are each preferably made of channel members with the inside of their flanges 16 coated with a nonskid material 17. A longitudinal coating 18 of the nonskid material is also provided on one half of the web of the long and short sections 14 and 15 of each of the tracks 10 and 11. The longitudinal coatings will then be on either the inner halves of the webs, as shown in Fig. 1, or the outer halves, depending upon the side by side arrangement of the tracks.

Each long section of rail has a hook 20 at one end thereof that is adapted to fit into a slot (not shown) provided therefore at the rear end of a truck bed 21. A catch 22 having a transverse slot 23 therein depends from the other end of each long section of rail and a pair of support legs, 24 and 25 are pivotally connected to the long rail sections. Each leg includes a pair of side supports 26 and 27 interconnected by upper and lower cross braces 28 and 29. The side supports are pivotally connected to the flanges of their respective rail section by bolts 30 inset into and passed through the side flanges and through holes provided therefore in the side supports. In practice, the long rail sections can be used alone, with the legs 24 and 25 folded thereunder, or the legs can be lowered to support the track sections and the short rail sections can be attached thereto as shown in Fig. 1. If desired, a removable bumper B can be provided at the rear of the truck bed 21 to prevent travel of the hand truck except on the tracks 10 and 11. The bumper can extend down into the same slots as do the hooks of the tracks.

Each short rail section includes a hook 31 at one end, adapted to fit into the slot at the rear end of the truck bed when the short sections are used alone as tracks, and to be connected into the slots 23 of the long rail sections when the short and long rail sections are to be coupled to provide extended tracks. When the short rail sections are connected to the long rail sections, the short sections rest on tongue portions of catches 22 and on the ground or loading dock, etc. to or from which goods to or from the truck are to be delivered. Because of their narrow configuration the rail sections can be readily stored, either within the truck itself or beneath the bed thereof on suspended hangars 32 provided for the purpose.

Hand truck 13 includes the usual side rails 33 and 34, interconnected at one end by a load platform 35 that extends forwardly thereof, and by an axle 36 that carries wheels 13a, and formed as handles 33a and 34a respectively, at their other ends.

Legs 37 and 38 are connected to extend from the side rail 33 and 34, respectively, intermediate their lengths. Each leg comprises a pair of braces 39 and 40, each of which is connected by a hinge 41 to the end of an adjustable extension arm 42. Each extension arm 42 includes a base piece 43 bolted across the side rails and a pair of adjustable pieces 44 that form continuations of the base piece outwardly of the side rails. Bolts 45 passed through holes in the adjustable pieces and through selected ones of a number of holes in the base piece secure the adjustable pieces in place. The hinges 41 are welded or otherwise secured to the outermost ends of the adjustable pieces and the legs can be readily aligned with the wheels 13a. Brace 40 converges toward brace 39 and toward central and end cross braces 46 and 47, respectively. Aligned holes 48 and 49 are provided in the braces 39 and 40, adjacent to end brace 47, to receive a bolt 50 that is adapted to be inserted through a skid shoe or the roller shoe of a wheel assembly, as will be explained.

Diagonal braces 51 are hingedly connected to the central braces 46 and are arranged to be secured by a bolt 52 passed through a cross brace 53 interconnecting the side rails 33 and 34 of the hand truck. Removal of nut 54 from bolt 52 and withdrawal of the bolt allows the legs to fold inwardly against the rear of the side rails and cross brace 53 where a conventional latch assembly, not shown, can be provided to hold them in place during storage of the hand truck, or on such occasions as the user may feel they are unnecessary in the use of the hand truck.

As has been previously noted, bolts 50 are inserted through holes 48 and 49 of the braces 39 and 40 making up legs 37 and 38, to respectively hold skid shoes 55 and 56 in place on the ends of the legs.

Each skid shoe is of generally box-like configuration, with a bottom, end walls, and side walls, but open at the top. It is sized to just fit over the end of braces 39 and 40 and the end brace 47, and holes 57 and 58 in the end walls, are arranged to be in alignment with the holes 48 and 49.

The bolts 50 are inserted through each of the aligned holes 58, 49, 48, and 57, lock washers 59 are placed thereon, and nuts 60 are tightened thereon to secure the skid shoes to the legs.

The bottom of each skid shoe is provided with a layer of skid-resistant material, 61, which may be rubber or other such material and at least one side wall is similarly provided with a layer of skid-resistant material 62. The skid shoes are then arranged on the legs 37 and 38 such that the skid shoes have the material 62 on walls facing outwardly with respect to the flanges of tracks 10 and 11.

A user of the apparatus of the invention will position the tracks to place the longitudinal coatings on either the inside or outside and will then adjust the extension arms 42 to follow behind the wheels 13a on either the coated or uncoated web portions of the tracks. Once the loaded hand truck is started down the tracks, with the wheels 35 guided therein, the user can allow the loaded hand truck to move down the tracks virtually under its own weight and the influence of gravity. The speed of travel of the hand truck will then be dependent upon whether or not the path followed by the skid shoes is covered with nonskid material and the resultant frictional resistance to such travel. Should the loaded hand truck fail to move because of the inability of the pull of gravity to overcome its inertia, it is only necessary for the user to give an initial push. In the event the load starts to move too rapidly, the user need only apply a twisting force to the handles of the hand truck, thereby moving the sides of skid shoes against the layer of antiskid material on the side flanges of the tracks. The amount of increased braking force desired will determine whether the side of the skid shoe having a layer of skid-resistant material 62 thereon or the other side is pushed against the side flanges. Naturally, the greatest braking force is obtained if the skid-resistant layers of material 62 on the shoes are forced against the nonskid coated surfaces 17 of the flanges 16 of the tracks. Both exterior surfaces of the side walls, of the skid shoes can be provided with skid-resistant material, if desired. Also, the skid shoes can be fixed at an angle with respect to the wheels so that when the truck is twisted to force the skid shoes against the side wall, they will fully engage as flat, mating surfaces, thereby providing a maximum braking effect.

As shown in FIGS. 6 and 7, a wheel assembly 63 can also be affixed to each of the legs 36 and 37 of the hand truck.

Each wheel assembly 63 includes a short post 64 having a castor wheel 65 inserted into one end thereof and a hole 66 through the other end. The bottom of each skid shoe is cut out at 67 and corresponding, aligned openings are provided through the layer of skid-resistant material 61 and the end brace 47. Thus, when the wheel assemblies are to be used, the nuts 60 and washer 59 are removed and bolts 50 are withdrawn through holes 48 and 57. Thereafter, the post 63 is inserted through the bottom of the skid shoe and bolt 50 is inserted through hole 66 in the post, is reinserted through the holes 48 and 57 and the washer and nut are again threaded thereon.

A flexible, skid-resistant braking flap 68 is connected to short post 64 and extends freely to a point beyond the outermost extremity of the castor wheel 65.

When not being used, the wheel assemblies can be removed and stored inside the skid shoes, with the wheel then extending along brace 39 and the bolt 50 again passing through the hole 66.

With the wheels 65 projecting beneath the skid shoes, the hand truck can be used as a wheeled dolly. Wheels 65 turn freely to allow for easy guiding of the hand truck, and the loaded hand truck can be easily pushed up the tracks by a user who will either walk between or on the tracks.

If, while the hand truck is being pushed up the tracks, it should start to move back down, the wheels 65 will quickly overrun the flaps 68 which are normally dragged behind the wheels, and will not thereafter turn. The flaps will then act as skids on the coated or uncoated portions of the tracks to retard or brake reverse travel of the hand truck.

In FIG. 7, there is shown an alternate roller shoe 70 of a type that can be secured to the ends of legs 37 and 38 in the same manner as the skid shoes 55 and 56 previously described. To use the roller shoes 70 instead of the skid shoes and wheel assemblies 63, it is necessary that bolts 50 be withdrawn and skid shoes 55 and 56 be removed. The roller shoes, which are of the same box-like configuration as the skid shoes but which have castor mounted wheels 71 projecting from the bottom thereof, can then be positioned on the legs 37 and 38 and the bolts can be reinserted. As with the previously disclosed embodiment of roller assembly, flaps 72 are suspended behind the wheels 71. As illustrated, flaps 72 are bolted to end walls of the roller shoes 70.

While the legs 37 and 38 are shown attached to a particular type of hand truck, it should be obvious that the same arrangement, including the skid shoes and the wheel assemblies, can be used with virtually any conventional hand truck.

Although certain preferred forms of my invention have been herein disclosed, it is to be understood that the present disclosure is made by way of example and that variations are possible without departing from the subject matter of the following claims, which subject matter I regard as my invention.

I claim:

1. Apparatus for material handling, comprising elongate transversely spaced track means adapted to span a distance across which material is to be transported, a nonskid surfacing material covering a longitudinally divided portion of the track means, and a hand truck adapted to be moved over said track means, said hand truck including interconnected side rails, a load platform extending forwardly of said side rails at one end thereof, wheels carried by said side rails adjacent to said load platform and adapted to run in said track means, a pair of rest legs extending rearwardly of the side rails intermediate the length thereof, and a skid shoe having a skid-resistant material on the bottom of at least one of the said legs and connected to the end of the rest leg remote from the side rails, the transverse spacing of the track means and the rest legs being so dimensioned that said at least one skid shoe may rest on either the longitudinally divided portion of the track means covered by the nonskid surfacing material or the longitudinally divided portion of the track means not covered by nonskid surfacing material.

2. Apparatus as in claim 1, wherein:
the track means comprises at least one channel member having upturned side flanges and a web;
the nonskid surfacing material covers the inside of at least one flange and one longitudinal half of the web; and
at least one side of the skid shoe is covered with skid-resistant material adapted to engage the flange of the track covered by nonskid material.

3. Apparatus as in claim 2, further including wheel means; and means for connecting said wheel means to provide wheels for the ends of the legs for use in lieu of the skid surface of the skid shoe.

4. Apparatus as in claim 3, wherein the wheel means comprises a roller shoe having a castor wheel on the bottom thereof, adapted to replace the skid shoe.

5. Apparatus as in claim 3, wherein the skid shoe has an opening through the bottom thereof; the wheel means includes a short post adapted to extend through the said opening and having a castor wheel extending from one end thereof and a hole through the other end adapted to receive a bolt securing it to the skid shoes.